(12) United States Patent
Gao et al.

(10) Patent No.: US 11,368,949 B2
(45) Date of Patent: Jun. 21, 2022

(54) INFORMATION INDICATION METHOD AND APPARATUS

(71) Applicant: Huawei Technologies Co., Ltd., Shenzhen (CN)

(72) Inventors: Fei Gao, Shanghai (CN); Shurong Jiao, Shanghai (CN); Han Zhou, Shanghai (CN); Xiaolei Tie, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/168,445

(22) Filed: Feb. 5, 2021

(65) Prior Publication Data

US 2021/0160835 A1 May 27, 2021

Related U.S. Application Data

(63) Continuation of application No. PCT/CN2019/099845, filed on Aug. 8, 2019.

(30) Foreign Application Priority Data

Aug. 8, 2018 (CN) .......................... 201810899323.7

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01)

(58) Field of Classification Search
CPC ......... H04W 77/0453; H04W 77/0413; H04W 77/042
See application file for complete search history.

(56) References Cited

U.S. PATENT DOCUMENTS

2018/0183551 A1 6/2018 Chou et al.
2021/0023812 A1* 1/2021 Yao .......................... B32B 7/12

FOREIGN PATENT DOCUMENTS

CN 102083223 A 6/2011
CN 107231217 A 10/2017
(Continued)

OTHER PUBLICATIONS

Mediatek, Inc., "RRM Measurement for Bandwidth Part Operation", 3GPP TSG-RAN WG2 Meeting #99, R2-1708001. Berlin, Germany, Aug. 21-25, 2017, 5 pages.
(Continued)

*Primary Examiner* — Kevin Kim
(74) *Attorney, Agent, or Firm* — Slater Matsil, LLP

(57) ABSTRACT

An information indication method is provided, including: A terminal-side device receives first higher layer signaling from a network-side device, where the first higher layer signaling is used to configure N bandwidth parts BWPs, and N is a positive integer. The terminal-side device receives downlink control information from the network-side device, where the downlink control information includes an indication field. When N is less than a maximum quantity of BWPs that can be configured through the first higher layer signaling when the terminal-side device is in a connected mode (for example, an RRC connected mode) or a maximum quantity of BWPs that can be determined by using candidate bit states of the indication field that is used to determine an active BWP and that is in the downlink control information, the indication field indicates a position of the active BWP located in an initial BWP and the N BWPs.

28 Claims, 5 Drawing Sheets

(56) References Cited

FOREIGN PATENT DOCUMENTS

| | | |
|---|---|---|
| CN | 107872891 A | 4/2018 |
| CN | 108135028 A | 6/2018 |
| KR | 20180081450 A | 7/2018 |
| WO | 2018085145 A1 | 5/2018 |
| WO | 2018121621 A1 | 7/2018 |
| WO | WO-2019159297 A1 * 8/2019 ........... H04L 5/0092 |

OTHER PUBLICATIONS

3GPP TS 38.211 V15.2.0 (Jun. 2018), 3rd Generation Partnership Project; Technical Specification Group Radio Access Network; NR; Physical channels and modulation (Release 15), 96 pages.
Huawei et al., "Bandwidth part activation and adaptation", 3GPP TSG RAN WG1 Meeting #91, R1-1719828, Reno, NV, US, Nov. 27-Dec. 1, 2017, 6 pages.
3GPP TS 38.212 V15.2.0 (Jun. 2018), 3rd Generation Partnership Project; Technical Specification Group Radio Access Network; NR; Multiplexing and channel coding (Release 15), 98 pages.
Intel Corporation, "Overall impact in RAN2 for BWP", 3GPP TSG RAN WG2 Meeting #99bis, R2-1710592, Prague, Czech Republic, Oct. 9-13, 2017, 8 pages.
3GPP TS 38.213 V15.2.0 (Jun. 2018), 3rd Generation Partnership Project; Technical Specification Group Radio Access Network; NR; Physical layer procedures for control (Release 15), 99 pages.
3GPP TS 38.331 V15.2.0 (Jun. 2018), 3rd Generation Partnership Project; Technical Specification Group Radio Access Network; NR; Radio Resource Control (RRC) protocol specification (Release 15), 304 pages.
Mediatek Inc. et al., "Summary of Bandwidth Part Operation", 3GPP TSG RAN WG1 Meeting 91, R1-1721504 Reno, NV, US, Nov. 27-Dec. 1, 2017, 13 pages.
Huawei et al., "Details on BWP Switching Operation", 3GPP TSG-RAN WG4 Meeting #86, R4-1802834, Athens, Greece, Feb. 26-Mar. 2, 2018, 9 pages.

* cited by examiner

INFORMATION INDICATION METHOD AND APPARATUS

CROSS-REFERENCE TO RELATED APPLICATIONS

This application is a continuation of International Application No. PCT/CN2019/099845, filed on Aug. 8, 2019, which claims priority to Chinese Patent Application No. 201810899323.7, filed on Aug. 8, 2018. The disclosures of the aforementioned applications are hereby incorporated by reference in their entireties.

TECHNICAL FIELD

Embodiments of this application relate to the field of communications technologies, and in particular, to an information indication method and an apparatus.

BACKGROUND

In a 5th generation (5G) communications system, that is, in a new radio (NR) system, a concept of bandwidth part (BWP) is introduced. A BWP is a segment of continuous frequency resources on a cell carrier. A network-side device may configure BWP-related information for a terminal-side device through higher layer signaling, where the BWP-related information includes a BWP identifier, configuration information corresponding to the BWP identifier, and the like. After a BWP is configured and activated, the BWP is referred to as an active BWP. Data and control information that are sent by the terminal-side device on an uplink or data and control information that are received on a downlink are limited in the active BWP. According to a current protocol, one terminal-side device can have only one active BWP.

Currently, there is still no specific solution to how a network-side device indicates, to a terminal side, a BWP that needs to be activated.

SUMMARY

Embodiments of this application provide an information indication method and an apparatus, to provide a solution to how a network-side device indicates, to a terminal side, a BWP that needs to be activated.

According to a first aspect, an embodiment of this application provides an information indication method, where the method includes the following.

A terminal-side device receives first higher layer signaling from a network-side device, where the first higher layer signaling is used to configure N bandwidth parts BWPs, and N is a positive integer. The terminal-side device receives downlink control information from the network-side device, and determines an active BWP based on the downlink control information. When N is less than a maximum quantity of BWPs that can be configured through the first higher layer signaling when the terminal-side device is in a connected mode, the downlink control information indicates a position of the active BWP in an initial BWP and the N BWPs.

According to the foregoing method, when N is less than the maximum quantity of BWPs that can be configured through the first higher layer signaling when the terminal-side device is in the connected mode, the downlink control information indicates the position of the active BWP, to indicate the active BWP. This avoids a problem that when a BWP identifier is used to indicate a BWP, an active BWP cannot be indicated because the downlink control information cannot indicate a BWP identifier.

In an optional implementation, a position of the initial BWP is before those of the N BWPs or after those of the N BWPs.

In an optional implementation, the downlink control information indicates the position of the active BWP by using an indication field; and the method further includes: The terminal-side device receives second higher layer signaling from the network-side device, where the second higher layer signaling is used to indicate to add M BWPs, and M is a positive integer. When N+M is less than the maximum quantity of BWPs that can be configured through the first higher layer signaling when the terminal-side device is in the connected mode, the terminal-side device establishes, based on a positional sequence, a correspondence between the initial BWP, the M BWPs, and the N BWPs, and candidate bit states of a bit included in the indication field.

According to the foregoing method, when the M BWPs are added, a correspondence between a position of a BWP and a candidate bit state of the bit included in the indication field is re-established, so that the position of the BWP can be updated in real time, thereby ensuring that a minimum quantity of bits in the indication field are used to indicate all BWPs.

In an optional implementation, the downlink control information indicates the position of the active BWP by using the indication field; and the method further includes: The terminal-side device receives third higher layer signaling from the network-side device, where the third higher layer signaling is used to indicate to delete P BWPs, and P is a positive integer less than N. The terminal-side device establishes, based on a positional sequence, a correspondence between the candidate bit states of the bit included in the indication field and remaining BWPs obtained after the P BWPs are deleted from the N BWPs and the initial BWP.

According to the foregoing method, when the P BWPs are deleted, a correspondence between a position of a BWP and a candidate bit state of the bit included in the indication field is re-established, so that the position of the BWP can be updated in real time, thereby ensuring that a minimum quantity of bits in the indication field are used to indicate all BWPs.

In an optional implementation, the downlink control information indicates the position of the active BWP by using an indication field; and the method further includes: The terminal-side device receives second higher layer signaling from the network-side device, where the second higher layer signaling is used to indicate to add M BWPs, and M is a positive integer. When N+M is less than the maximum quantity of BWPs that can be configured through the first higher layer signaling when the terminal-side device is in the connected mode, the terminal-side device establishes, based on BWP identifiers, a correspondence between the initial BWP, the M BWPs, and the N BWPs, and candidate bit states of a bit included in the indication field.

According to the foregoing method, when the M BWPs are added, a position of a BWP can be updated in real time based on a BWP identifier, to ensure that a minimum quantity of bits in the indication field are used to indicate all BWPs.

In an optional implementation, the downlink control information indicates the position of the active BWP by using the indication field; and the method further includes: The terminal-side device receives third higher layer signaling from the network-side device, where the third higher layer signaling is used to indicate to delete P BWPs, and P is a positive integer less than N. The terminal-side device establishes, based on BWP identifiers, a correspondence between the candidate bit states of the bit included in the indication field and remaining BWPs obtained after the P BWPs are deleted from the N BWPs and the initial BWP.

According to the foregoing method, when the P BWPs are deleted, a position of a BWP can be updated in real time based on a BWP identifier, to ensure that a minimum quantity of bits in the indication field are used to indicate all BWPs.

According to a second aspect, an embodiment of this application provides a terminal-side device, where the terminal-side device includes a memory, a transceiver, and a processor. The memory is configured to store an instruction. The processor is configured to execute the instruction stored in the memory and control the transceiver to receive and send a signal. When executing the instruction stored in the memory, the processor is configured to perform the method in the first aspect or any possible design of the first aspect.

According to a third aspect, an embodiment of this application provides a terminal-side device configured to implement the method in the first aspect, or any possible design of the first aspect. The terminal-side device includes corresponding functional modules, for example, includes a processing unit and a transceiver unit, which are configured to implement steps in the foregoing method.

According to a fourth aspect, an embodiment of this application provides an information indication method, including the following.

A network-side device sends first higher layer signaling to a terminal-side device, where the first higher layer signaling is used to configure N bandwidth parts BWPs, and N is a positive integer. The network-side device sends downlink control information to the terminal-side device, where when N is less than a maximum quantity of BWPs that can be configured through the first higher layer signaling when the terminal-side device is in a connected mode, the downlink control information indicates a position of an active BWP in an initial BWP and the N BWPs.

According to the foregoing method, when N is less than the maximum quantity of BWPs that can be configured through the first higher layer signaling when the terminal-side device is in the connected mode, the downlink control information indicates the position of the active BWP, to indicate the active BWP. This avoids a problem that when a BWP identifier is used to indicate a BWP, an active BWP cannot be indicated because the downlink control information cannot indicate a BWP identifier.

In an optional implementation, a position of the initial BWP is before those of the N BWPs or after those of the N BWPs.

In an optional implementation, the downlink control information indicates the position of the active BWP by using an indication field; and the method further includes: The network-side device adds M BWPs, where M is a positive integer. When N+M is less than the maximum quantity of BWPs that can be configured through the first higher layer signaling when the terminal-side device is in the connected mode, the network-side device establishes, based on a positional sequence, a correspondence between the initial BWP, the M BWPs, and the N BWPs, and candidate bit states of a bit included in the indication field.

In an optional implementation, the downlink control information indicates the position of the active BWP by using the indication field; and the method further includes: The network-side device deletes P BWPs, where P is a positive integer less than N. The network-side device establishes, based on a positional sequence, a correspondence between the candidate bit states of the bit included in the indication field and remaining BWPs obtained after the P BWPs are deleted from the N BWPs and the initial BWP.

In an optional implementation, the downlink control information indicates the position of the active BWP by using an indication field; and the method further includes: The network-side device adds M BWPs, where M is a positive integer. When N+M is less than the maximum quantity of BWPs that can be configured through the first higher layer signaling when the terminal-side device is in the connected mode, the network-side device establishes, based on BWP identifiers, a correspondence between the initial BWP, the M BWPs, and the N BWPs, and candidate bit states of a bit included in the indication field.

According to the foregoing method, when the M BWPs are added, a position of a BWP can be updated in real time based on a BWP identifier, to ensure that a minimum quantity of bits in the indication field are used to indicate all BWPs.

In an optional implementation, that the network-side device adds M BWPs includes: The network-side device sends second higher layer signaling to the terminal-side device, where the second higher layer signaling is used to indicate to add the M BWPs.

In an optional implementation, the downlink control information indicates the position of the active BWP by using the indication field; and the method further includes: The network-side device deletes P BWPs, where P is a positive integer less than N.

The network-side device establishes, based on BWP identifiers, a correspondence between the candidate bit states of the bit included in the indication field and remaining BWPs obtained after the P BWPs are deleted from the N BWPs and the initial BWP.

According to the foregoing method, when the P BWPs are deleted, a position of a BWP can be updated in real time based on a BWP identifier, to ensure that a minimum quantity of bits in the indication field are used to indicate all BWPs.

In an optional implementation, that the network-side device deletes P BWPs includes:

The network-side device sends third higher layer signaling to the terminal-side device, where the third higher layer signaling is used to indicate to delete the P BWPs.

According to a fifth aspect, an embodiment of this application provides a network-side device, where the network-side device includes a memory, a radio frequency unit, and a processor. The memory is configured to store an instruction. The processor is configured to execute the instruction stored in the memory, and control the radio frequency unit to receive and send a signal. When executing the instruction stored in the memory, the processor is configured to perform the method in the fourth aspect or any possible design of the fourth aspect.

According to a sixth aspect, an embodiment of this application provides a network-side device, configured to implement the method in the fourth aspect or any possible design of the fourth aspect. The network-side device includes corresponding functional modules, for example, includes a processing unit and a transceiver unit, which are configured to implement steps in the foregoing method.

According to a seventh aspect, an embodiment of this application provides an information update method, including the following.

A terminal-side device receives first higher layer signaling from a network-side device, where the first higher layer signaling is used to configure N bandwidth parts BWPs, and N is a positive integer.

The terminal-side device receives second higher layer signaling from the network-side device, where the second higher layer signaling is used to indicate to update BWP identifiers of K BWPs in the N BWPs, and K is a positive integer less than or equal to N.

According to the foregoing method, the network-side device may update only the BWP identifier of the BWP through the second higher layer signaling, to implement flexible configuration of the BWP. This avoids updating all information of the BWP while the configuration information of the BWP is updated, thereby reducing signaling overheads.

In an optional implementation, a size of an updated BWP identifier of each of the K BWPs is less than or equal to 2 to the $q^{th}$ power, and is not equal to 0. When N is less than a maximum quantity of BWPs that can be configured through the first higher layer signaling when the terminal-side device is in a connected mode, $q=\lceil\log_2(N+1)\rceil$. When N is equal to the maximum quantity of BWPs that can be configured through the first higher layer signaling when the terminal-side device is in the connected mode, $q=\lceil\log_2(N)\rceil$. $\lceil\ \rceil$ is a round up operation.

According to an eighth aspect, an embodiment of this application provides an information update method, including the following.

A network-side device sends first higher layer signaling to a terminal-side device, where the first higher layer signaling is used to configure N bandwidth parts BWPs, and N is a positive integer.

The network-side device sends second higher layer signaling to the terminal-side device, where the second higher layer signaling is used to indicate to update BWP identifiers of K BWPs in the N BWPs, and K is an integer less than or equal to N.

According to the foregoing method, the network-side device may update only the BWP identifier of the BWP through the second higher layer signaling, to implement flexible configuration of the BWP. This avoids updating all information of the BWP while the configuration information of the BWP is updated, thereby reducing signaling overheads.

In an optional implementation, a size of an updated BWP identifier of each of the K BWPs is less than or equal to 2 to the $q^{th}$ power, and is not equal to 0. When N is less than a maximum quantity of BWPs that can be configured through the first higher layer signaling when the terminal-side device is in a connected mode, $q=\lceil\log_2(N+1)\rceil$. When N is equal to the maximum quantity of BWPs that can be configured through the first higher layer signaling when the terminal-side device is in the connected mode, $q=\lceil\log_2(N)\rceil$. $\lceil\ \rceil$ is a round up operation.

According to a ninth aspect, an embodiment of this application provides an information indication method, including:

A terminal-side device receives higher layer signaling from a network-side device, where the higher layer signaling is used to configure N bandwidth parts BWPs, and N is a positive integer. The terminal-side device receives downlink control information from the network-side device, and determines an active BWP based on the downlink control information.

The downlink control information includes an indication field, and the indication field indicates a BWP identifier of the active BWP. The indication field includes L bits, L is greater than or equal to P, and P is a quantity of bits included in the BWP identifier.

According to the foregoing method, a quantity of bits included in the indication field is greater than or equal to the quantity of bits included in the BWP identifier, so that all possible BWP identifiers can be indicated, thereby avoiding a problem that a BWP cannot be indicated when the quantity of bits is less than that in the BWP identifier.

In an optional implementation, a value of L is 3.

According to a tenth aspect, an embodiment of this application provides an information indication method, including:

A network-side device sends higher layer signaling to a terminal-side device, where the higher layer signaling is used to configure N bandwidth parts BWPs, and N is a positive integer.

The network-side device sends downlink control information to the terminal-side device.

The downlink control information includes an indication field, and the indication field indicates a BWP identifier of an active BWP. The indication field includes L bits, L is greater than or equal to X, and X is a quantity of bits corresponding to a maximum quantity of BWPs supported by the terminal-side device.

According to the foregoing method, a quantity of bits included in the indication field is greater than or equal to the quantity of bits corresponding to the maximum quantity of BWPs supported by the terminal-side device, so that all possible BWP identifiers can be indicated, thereby avoiding a problem that identifiers of some active BWPs cannot be indicated because bits in the indication field are insufficient.

In an optional implementation, a value of L is 3.

According to an eleventh aspect, an embodiment of this application provides a computer-readable storage medium. The computer storage medium stores a computer readable instruction. When a computer reads and executes the computer readable instruction, the computer is enabled to perform the method in any one of the foregoing aspects or any possible design of the foregoing aspects.

According to a twelfth aspect, an embodiment of this application provides a computer program product. When a computer reads and executes the computer program product, the computer is enabled to perform the method in any one of the foregoing aspects or any possible design of the foregoing aspects.

According to a thirteenth aspect, an embodiment of this application provides a chip. The chip is connected to a memory, and is configured to read and execute a software program stored in the memory, to implement the method in any one of the foregoing aspects or any possible design of the foregoing aspects.

According to a fourteenth aspect, an embodiment of this application provides a communications system, including the terminal-side device and the network-side device in any one of the foregoing aspects.

DETAILED DESCRIPTION OF ILLUSTRATIVE EMBODIMENTS

Figure 1:
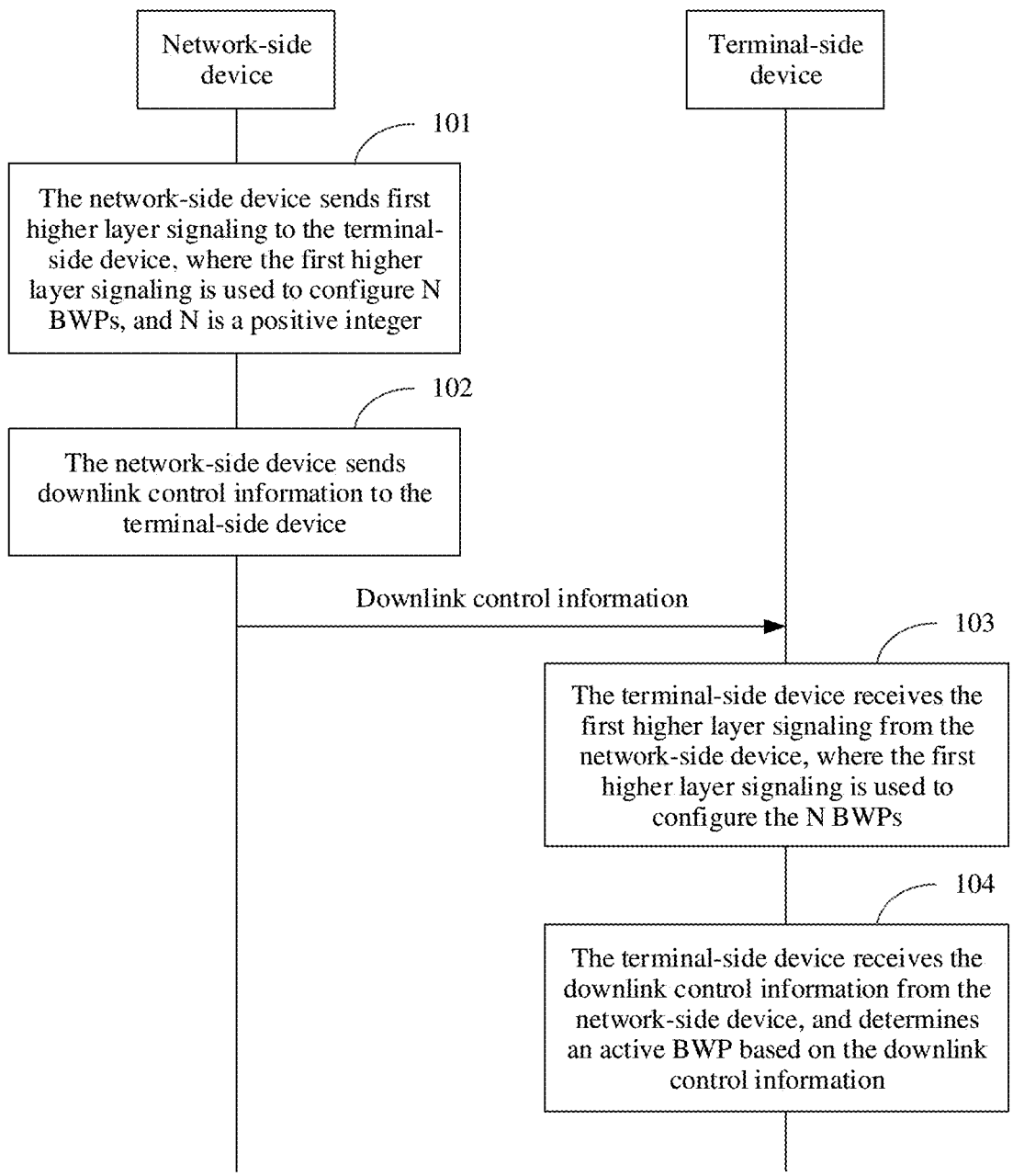
FIG. 1 is a schematic flowchart of an information indication method according to an embodiment of this application.

The following describes the embodiments of this application in detail with reference to the accompanying drawings of this specification.

The embodiments of this application may be applied to mobile communications systems in various standards, for example, a new radio (NR) system, a long term evolution (LTE) system, a long term evolution-advanced (LTE-A) system, an evolved long term evolution (eLTE) system, a future mobile communications system, and the like. This is not limited herein.

In the embodiments of this application, a terminal-side device is a device having a wireless transceiver function or a chip that can be disposed in the device. The device having the wireless transceiver function may also be referred to as user equipment (UE), an access terminal, a subscriber unit, a remote terminal, a mobile device, a user terminal, a user agent, or a user apparatus. During actual application, the terminal-side device in the embodiments of this application may be a mobile phone, a tablet (Pad), a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. In this application, the device having the wireless transceiver function and the chip that can be disposed in the device are collectively referred to as the terminal-side device.

In the embodiments of this application, a network-side device may be a radio access device in any standard, for example, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (WIFI) system, a wireless relay node, a wireless backhaul node, or a transmission point (transmission and reception point (TRP) or TP), or may be a gNB in a 5G system, a network node that constitutes a gNB or a transmission point in a 5G system, or the like.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

In the embodiments of this application, each BWP in at least one BWP configured by the network-side device for the terminal-side device corresponds to one BWP identifier and bandwidth part configuration information. The BWP identifier may uniquely indicate one BWP, and a value of the BWP identifier may be 0 to 4, or may be another value. The bandwidth part configuration information includes information such as a subcarrier spacing of the bandwidth part and a bandwidth of the bandwidth part. For details, refer to the current technology. Details are not described herein.

After the network-side device configures the at least one BWP for the terminal-side device, when indicating an active BWP in the at least one BWP to the terminal-side device, the network-side device may indicate the active BWP to the terminal-side device by using downlink control information (DCI). Therefore, the terminal-side device may receive data, control information, or the like in the active BWP, or send data in the active BWP. Details are described below.

FIG. 1 is a schematic flowchart of an information indication method according to an embodiment of this application.

The method includes the following steps.

Step 101: A network-side device sends first higher layer signaling to a terminal-side device, where the first higher layer signaling is used to configure N BWPs, and N is a positive integer.

Step 102: The network-side device sends downlink control information to the terminal-side device.

In this embodiment of this application, the downlink control information may include an indication field used to determine an active BWP, and the active BWP may be determined by using the indication field in the downlink control information and by indicating a position of the active BWP.

When N is less than a maximum quantity of BWPs that can be configured through the first higher layer signaling (for example, RRC signaling) when the terminal-side device is in a connected mode (for example, an RRC connected mode) or a maximum quantity of BWPs that can be determined by using candidate bit states of the indication field that is used to determine the active BWP and that is in the downlink control information, the downlink control information indicates the position of the active BWP in an initial BWP and the N BWPs. Optionally, the maximum quantity of BWPs that can be configured through the first higher layer signaling when the terminal-side device is in the connected mode is equal to the maximum quantity of BWPs that can be determined by using the candidate bit states of the indication field that is used to determine the active BWP and that is in the downlink control information. For example, if the indication field that is used to determine the active BWP and that is in the downlink control information is two bits, there are four candidate bit states: 00, 01, 10, and 11, and four BWPs can be determined. When a candidate bit state in the four bit states in the downlink control information is used, a BWP determined by using the candidate bit state is the active BWP. In this case, when the terminal-side device is in an RRC connected state, a maximum of four BWPs (where N is less than or equal to 4) can be configured through the first higher layer signaling.

The initial BWP is a BWP used when the terminal-side device initially accesses (for example, randomly accesses) the network-side device. In this case, the active BWP is determined from the initial BWP and the N BWPs.

In this embodiment of this application, when N is equal to the maximum quantity of BWPs that can be configured through the first higher layer signaling and that are supported when the terminal-side device is in the connected mode (for example, an RRC connected mode) or the maximum quantity of BWPs that can be indicated by the indication field that is used to determine the active BWP and that is in the downlink control information, the downlink control information may further indicate a position of the active BWP located in the N BWPs. In this case, the initial BWP is not considered, and the active BWP is determined from the N BWPs.

Step 103: The terminal-side device receives the first higher layer signaling from the network-side device, where the first higher layer signaling is used to configure the N BWPs.

Step 104: The terminal-side device receives the downlink control information from the network-side device, and determines the active BWP based on the downlink control information.

In step 101, the first higher layer signaling may be radio resource control (RRC) signaling or the like.

A value of N may be determined based on an actual case. For example, in the 3GPP standard, N may be any value from 1 to 4. Certainly, N may alternatively be another value. Details are not described herein. In this embodiment of this application, in addition to the N BWPs configured by the network-side device, there is further the initial BWP. When N is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, and when the network-side device activates the initial BWP, the downlink control information may be used to indicate that the initial BWP is the active BWP. When N is equal to the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, the initial BWP is not considered as the active BWP based on the downlink control information. In this case, the network device cannot activate the initial BWP.

The initial BWP is configured by the network-side device in an initial access process of the terminal-side device, for example, is broadcast to the terminal-side device through a system information block (SIB). A configuration (for example, an identifier (usually a BWP #0), a frequency domain location, and a bandwidth) of the initial BWP in the initial access process is a common configuration for a plurality of terminal-side devices. When the terminal-side device is in the connected mode, the network-side device optionally adds, for the terminal-side device through higher layer signaling (for example, RRC signaling), a configuration dedicated to the terminal-side device to the initial BWP. Even if a dedicated configuration is added to the initial BWP through higher layer signaling when the terminal-side device is in the connected mode, the initial BWP in this case is not included in the BWPs, of the maximum quantity (for example, 4), that can be configured through the higher layer signaling when the terminal-side device is in the connected mode and that are mentioned in this embodiment of the present invention.

The initial access process includes but is not limited to: a process from powering on the terminal-side device to completing establishment of a connected mode (for example, an RRC connected mode) between the terminal-side device and the network-side device; a process in which the terminal-side device is reconnected to the network-side device, or reselects to or is handed over to another network-side device because of interruption of a connection between the terminal-side device and the network-side device, for example, a radio link failure (RLF) or an RLC failure at a radio link control (RLC) layer; or an initial access process in any scenario of initiating a random access process to access a network-side device by using a BWP.

In an example, the terminal-side device successfully accesses the network-side device and is in a connected mode, and the network-side device configures N=2 BWPs (a BWP #1 and a BWP #2) for the terminal-side device through higher layer signaling (for example, RRC signaling). In this case, N is less than a maximum quantity (for example, 4) of BWPs that can be configured through higher layer signaling when the terminal-side device is in the connected mode. Therefore, a quantity of bits of the downlink control information is $q=\lceil \log_2(N+1) \rceil=2$, and there are four candidate bit states. A bit state "00" of the downlink control information is used to indicate the initial BWP (a BWP #0). A positional sequence of two BWPs configured through higher layer signaling when the terminal-side device is in the connected mode is determined by sorting identifiers of the two BWPs in ascending order. Therefore, a bit state "01" of the downlink control information is used to indicate the BWP #1, the bit state "10" is used to indicate the BWP #2, and the bit state "11" does not indicate any BWP.

In this embodiment of this application, when N+M is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a correspondence may be established, based on a positional sequence, between the initial BWP, the M BWPs, and the N BWPs, and the candidate bit states of the bit included in the indication field. When N+M is equal to the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a correspondence may be established, based on a positional sequence, between the M BWPs and the N BWPs, and the candidate bit states of the bit included in the indication field.

The candidate bit states of the bit included in the indication field may be various possible values of the bits included in the indication field.

According to the foregoing description, the N BWPs are sorted based on a positional sequence, and each BWP corresponds to one position. When N is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a position of the initial BWP is a fixed position, and the initial BWP may be fixed before the N BWPs, may be fixed after the N BWPs, or may be fixed at another position. When N is equal to the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, the position of the initial BWP is not considered, and therefore the initial BWP is not used as the active BWP. In this case, the network-side device indicates the active BWP in the configured N BWPs.

In this embodiment of this application, a position of a BWP in the N BWPs may be determined in a plurality of manners. It should be noted that the following manner of determining the position of the BWP may be applicable to the network-side device and the terminal-side device. In other words, the network-side device may not need to directly notify the terminal-side device of a determined position of a BWP, and the terminal-side device may determine the position of the BWP in a manner preset by the network-side device.

In a first possible implementation, a position of a BWP in the N BWPs is determined based on a sorting sequence obtained after BWP identifiers of the N BWPs are sorted in ascending order.

Further, when N is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, the position of an initial BWP is before those of the N BWPs, and a positional sequence of the N BWPs is a sorting sequence obtained after a BWP identifier of the initial BWP and the BWP identifiers of the N BWPs are sorted in ascending order of identifier sizes. When N is equal to the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a positional sequence of the N BWPs is a sorting sequence obtained after the BWP identifiers of the N BWPs are sorted in ascending order.

For example, when N=4, and N is equal to the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a sequence of the BWP identifiers of the N BWPs configured by the network-side device is: a BWP identifier 3→a BWP identifier 4→a BWP identifier 2→a BWP identifier 1, as shown in Table 1.

TABLE 1

| Candidate bit state of bits included in an indication field | Position of a BWP (this is an optional column, and the following tables are similar) | BWP identifier |
| --- | --- | --- |
| 00 | 1 | 3 |
| 01 | 2 | 4 |
| 10 | 3 | 2 |
| 11 | 4 | 1 |

It should be noted that, in this embodiment of this application, different candidate bit states of the bits included in the indication field correspond to positions of different BWPs, and correspond to different BWP identifiers. Table 1 established by using the foregoing method is actually a correspondence established between the BWP identifier and the candidate bit state of the bits included in the indication field.

It should be noted that, in Table 1, the position of the BWP is merely used to describe how the candidate bit state of the bits included in the indication field corresponds to the BWP identifier. Actually, the network-side device and the terminal-side device may possibly include the correspondence between the BWP identifier and the candidate bit state of the bits included in the indication field, but do not include a correspondence between the position of the BWP and the candidate bit state of the bits included in the indication field.

Figure 2:
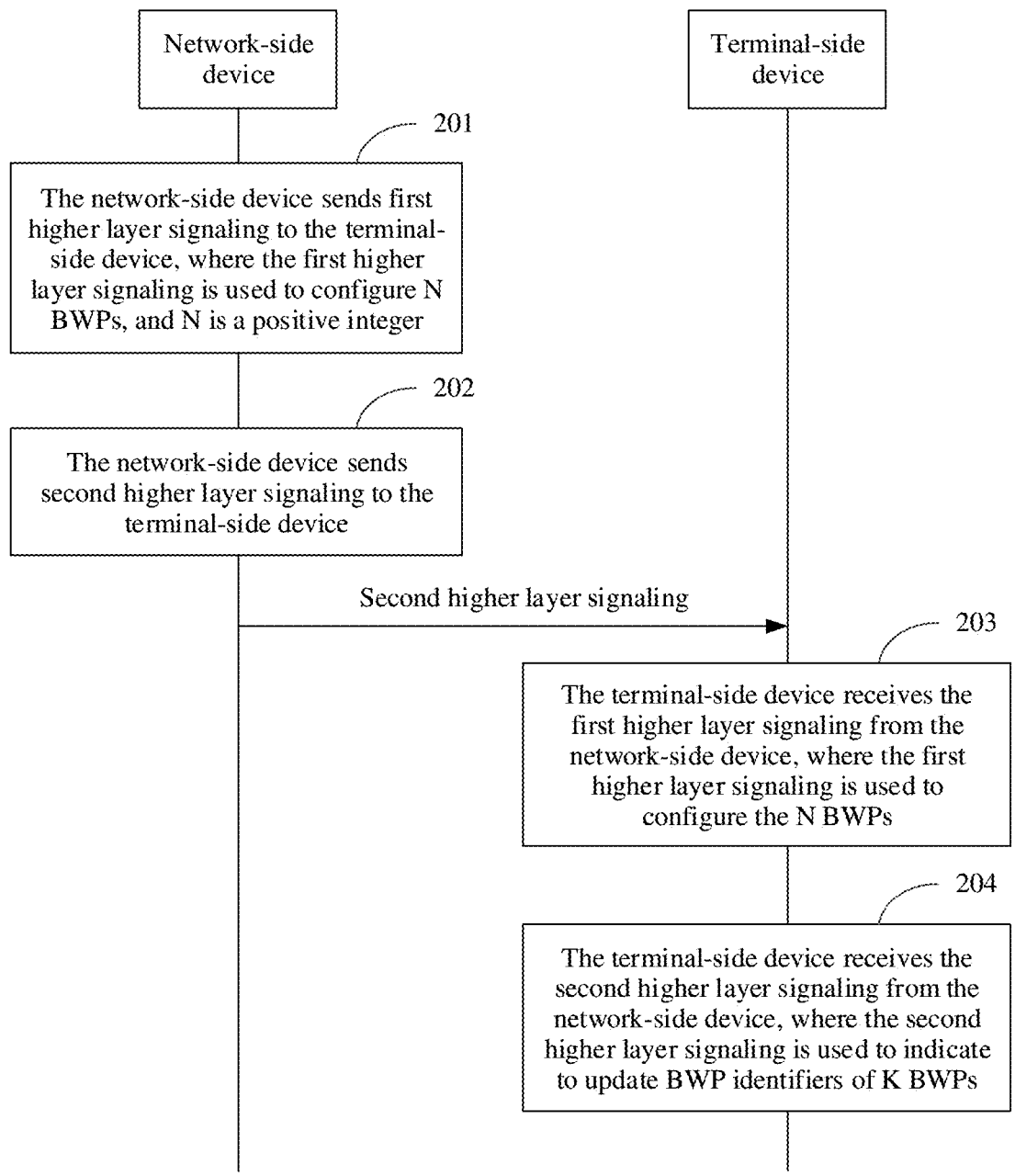
FIG. 2 is a schematic flowchart of an information indication method according to an embodiment of this application.

In another example, when N=2, and N is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, the BWP identifier of the initial BWP is 0, and the position of the initial BWP is before those of the N BWPs. The BWP identifiers of the N BWPs configured by the network-side device are 1 and 3, as shown in FIG. 2.

TABLE 2

| Candidate bit state of bits included in an indication field | Position of a BWP | BWP identifier |
| --- | --- | --- |
| 00 | 1 | 0 |
| 01 | 2 | 1 |
| 10 | 3 | 3 |
| 11 | 4 | |

When the candidate bit state of the bits included in the indication field is 11, the candidate bit state does not correspond to any BWP, and a position corresponding to a BWP identifier is empty. This is not described in the following tables.

It should be noted that, in Table 2, different candidate bit states of the bits included in the indication field correspond to positions of different BWPs, and correspond to different BWP identifiers. Table 2 established by using the foregoing method is actually a correspondence established between the position of the BWP, the BWP identifier, and the candidate bit state of the bits included in the indication field.

It should be noted that, in Table 2, the position of the BWP is merely used to describe how the candidate bit state of the bits included in the indication field corresponds to the BWP identifier. Actually, the network-side device and the terminal-side device may possibly include only a correspondence between the BWP identifier and the candidate bit state of the bits included in the indication field, but do not include a correspondence between the position of the BWP and the candidate bit state of the bits included in the indication field.

In a second possible implementation, a position of a BWP is determined based on a BWP identifier of the BWP.

For example, the N BWPs are sorted based on sizes of BWP identifiers of the BWPs.

For example, BWP identifiers of the N BWPs are sorted in descending order, and a position of a sorted BWP in the N BWPs is a position corresponding to the BWP in the N BWPs. Alternatively, the BWP identifiers of the BWPs may be sorted in ascending order. Details are not described herein again.

It should be noted that when N is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, the position of the sorted BWP in the N BWPs needs to be determined further with reference to the position of an initial BWP.

For example, when N=4, and N is equal to the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, the BWP identifiers of the N BWPs configured by the network-side device are 1, 2, 3, and 4. A positional sequence of the BWPs is a sequence obtained after the BWP identifiers are sorted in descending order, as shown in Table 3.

TABLE 3

| Candidate bit state of bits included in an indication field | Position of a BWP | BWP identifier |
|---|---|---|
| 00 | 1 | 4 |
| 01 | 2 | 3 |
| 10 | 3 | 2 |
| 11 | 4 | 1 |

It should be noted that, in Table 3, different candidate bit states of the bits included in the indication field may correspond to positions of different BWPs. Table 3 established by using the foregoing method is actually a correspondence established between the position of the BWP, the BWP identifier, and the candidate bit state of the bits included in the indication field.

It should be noted that, in Table 3, the position of the BWP is merely used to describe how the candidate bit state of the bits included in the indication field corresponds to the BWP identifier. Actually, the network-side device and the terminal-side device may possibly include only a correspondence between the BWP identifier and the candidate bit state of the bits included in the indication field, but do not include a correspondence between the position of the BWP and the candidate bit state of the bits included in the indication field.

In another example, when N=2, and N is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a BWP identifier of the initial BWP is 0, and the position of the initial BWP is after those of the N BWPs. The BWP identifiers of the N BWPs configured by the network-side device are 1 and 2. A positional sequence of the BWPs is a sequence obtained after the BWP identifiers are sorted in descending order, as shown in Table 4.

TABLE 4

| Candidate bit state of bits included in an indication field | Position of a BWP | BWP identifier |
|---|---|---|
| 00 | 1 | 2 |
| 01 | 2 | 1 |
| 10 | 3 | |
| 11 | 4 | 0 |

Table 4 established by using the foregoing method is actually a correspondence established between the position of the BWP, the BWP identifier, and the candidate bit state of the bits included in the indication field.

The foregoing is merely an example, and another positional sequence may also exist. Details are not described herein again.

It should be noted that, in Table 4, the position of the BWP is merely used to describe how the candidate bit state of the bits included in the indication field corresponds to the BWP identifier. Actually, the network-side device and the terminal-side device may possibly include only a correspondence between the BWP identifier and the candidate bit state of the bits included in the indication field, but do not include a correspondence between the position of the BWP and the candidate bit state of the bits included in the indication field.

In a third possible implementation, a positional sequence of the BWPs is a BWP sequence configured by the network-side device.

Figure 5:
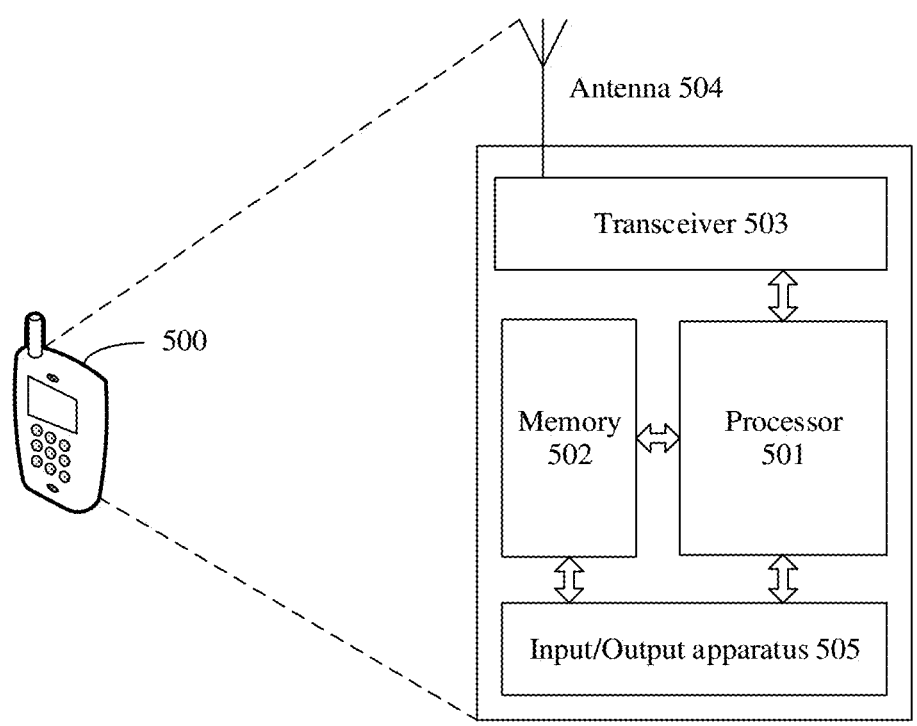
FIG. 5 is a schematic structural diagram of a terminal-side device according to an embodiment of this application.

For example, when N=4, and N is equal to the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a sequence of the N BWPs configured by the network-side device is a BWP 1 to a BWP 4, and BWP identifiers of the BWP 1 to the BWP 4 are 3, 4, 2, and 1, as shown in FIG. 5.

TABLE 5

| Candidate bit state of bits included in an indication field | Position of a BWP | BWP identifier |
|---|---|---|
| 00 | 1 | 3 |
| 01 | 2 | 4 |
| 10 | 3 | 2 |
| 11 | 4 | 1 |

Table 5 established by using the foregoing method is actually a correspondence established between the position, of the BWP, configured by the network-side device, the sequence of the BWP identifier, and the candidate bit state of the bits included in the indication field.

It should be noted that, in Table 5, the position of the BWP is merely used to describe how the candidate bit state of the bits included in the indication field corresponds to the BWP identifier. Actually, the network-side device and the terminal-side device may possibly include only a correspondence between the BWP identifier and the candidate bit state of the bits included in the indication field, but do not include a correspondence between the position of the BWP and the candidate bit state of the bits included in the indication field.

In another example, when N=3, and N is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a BWP identifier of the initial BWP is 0, and the position of the initial BWP is after those of the N BWPs. The sequence of the N BWPs configured by the network-side device is a BWP 1 to a BWP 3, and BWP identifiers of the BWP 1 to the BWP 3 are 3, 4, and 2. A positional sequence of the BWPs is shown in Table 6.

TABLE 6

| Candidate bit state of bits included in an indication field | Position of a BWP | BWP identifier |
|---|---|---|
| 00 | 1 | 3 |
| 01 | 2 | 4 |
| 10 | 3 | 2 |
| 11 | 4 | 0 |

Table 6 established by using the foregoing method is actually a correspondence established between the BWP sequence configured by the network-side device and the candidate bit state of the bits included in the indication field. The following Table 7 to Table 13 are not described one by one.

It should be noted that, in Table 6, the positional sequence of the BWPs is merely used to describe how the candidate bit state of the bits included in the indication field corresponds to the BWP identifier. Actually, the network-side device and the terminal-side device may possibly include only a correspondence between the BWP identifier and the candidate bit state of the bits included in the indication field, but do not include a correspondence between the position of the BWP and the candidate bit state of the bits included in the indication field. The following Table 7 to Table 13 are not described one by one.

In step 102, the N BWPs configured by the network-side device do not include the initial BWP, where when N=4, a quantity of bits included in the indication field is 2 to the $q^{th}$ power, and $q=\lceil \log_2 (N) \rceil$; and when N<4, $q=\lceil \log_2(N+1) \rceil$, where is a round up operation.

For example, with reference to Table 1, when the network-side device indicates that a BWP identifier of a to-be-activated BWP is 4, the network-side device sets a value of the indication field to 11, to indicate to activate the BWP whose BWP identifier is 4. Details are not described in another case.

In another example, with reference to Table 2, when the network-side device indicates that a BWP whose BWP identifier is 3 is to be activated, the network-side device sets a value of the indication field to 10, to indicate to activate the BWP whose BWP identifier is 3. Details are not described in another case.

In this embodiment of this application, after configuring the N BWPs, the network-side device may further add M BWPs or delete P BWPs, where M is a positive integer, and P is a positive integer less than N. After the network-side device adds the M BWPs or deletes the P BWPs, the position of each BWP may be updated. For how to determine the updated position, refer to the foregoing first possible implementation to the foregoing third possible implementation.

It should be noted that after the network-side device adds the M BWPs or deletes the P BWPs, the network-side device and the terminal-side device update the position of each BWP by using a same method, so that positions of BWPs having a same BWP identifier are consistent in the network-side device and the terminal-side device.

For example, in the foregoing third possible implementation, the following scenarios exist.

In a first possible scenario, after the M BWPs are added, when N+M is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a correspondence between the initial BWP, the M BWPs, and the N BWPs, and the candidate bit states of the bit included in the indication field is established based on BWP identifiers.

Specifically, when N+M is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, the network-side device and the terminal-side device update a position of each BWP in the following manner: updating a position of each BWP in the initial BWP, the M BWPs, and the N BWPs in ascending order of the BWP identifiers.

Certainly, in the foregoing indication example, the position of each BWP may alternatively be updated in descending order of the BWP identifiers. For details, refer to the foregoing descriptions. Details are not described herein again.

For example, with reference to Table 2, when N=2 and M=1, when the network-side device adds a BWP whose BWP identifier is 2 to the N BWPs shown in Table 2, a position of each BWP in N+M BWPs is updated in ascending order of BWP identifiers, as shown in Table 7.

TABLE 7

| Candidate bit state of bits included in an indication field | Position of a BWP | BWP identifier |
|---|---|---|
| 00 | 1 | 0 |
| 01 | 2 | 1 |
| 10 | 3 | 2 |
| 11 | 4 | 3 |

It should be noted that, after the position of the BWP is updated, a candidate bit state that is of the bits included in the indication field and that is corresponding to the position of each BWP is correspondingly changed. When the indication field is 10, a BWP whose position is 3 is indicated. With reference to Table 7, the indication field indicates that a BWP whose BWP identifier is 2 is to be activated. In Table 2, when the indication field is 10, the indication field indicates that a BWP whose BWP identifier is 3 is to be activated. Other cases are not described herein.

In a second possible scenario, after the M BWPs are added, when N+M is equal to the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a correspondence between the M BWPs and the N BWPs, and the candidate bit states of the bit included in the indication field is established based on BWP identifiers.

Specifically, when N+M is equal to the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, the network-side device and the terminal-side device update a position of each BWP in the following manner: updating a position of each BWP in the M BWPs and the N BWPs in ascending order of the BWP identifiers.

For example, with reference to Table 2, when N=2 and M=2, when the network-side device adds BWPs whose BWP identifiers are 2 and 4 to the N BWPs shown in Table 2, a position of each BWP in N+M BWPs is updated in ascending order of the BWP identifiers, as shown in Table 8.

TABLE 8

| Candidate bit state of bits included in an indication field | Position of a BWP | BWP identifier |
| --- | --- | --- |
| 00 | 1 | 1 |
| 01 | 2 | 2 |
| 10 | 3 | 3 |
| 11 | 4 | 4 |

In this case, a BWP whose BWP identifier is 0, namely, the initial BWP in Table 2, is removed, and the network-side device cannot indicate the initial BWP by using the indication field.

It should be noted that, after the position of the BWP is updated, a candidate bit state that is of the bits included in the indication field and that is corresponding to the position of each BWP is correspondingly changed. When the indication field is 01, a BWP whose position is 2 is indicated. With reference to Table 8, the indication field indicates that a BWP whose BWP identifier is 2 is to be activated. In Table 2, when the indication field is 01, the indication field indicates that a BWP whose BWP identifier is 1 is to be activated. Other cases are not described herein.

In a third possible scenario, after the P BWPs are deleted, a correspondence is established, based on BWP identifiers, between the candidate bit states of the bit included in the indication field and remaining BWPs obtained after the P BWPs are deleted.

Specifically, after the P BWPs are deleted, the network-side device and the terminal-side device update a position of each BWP in the following manner: updating, in ascending order of BWP identifiers, a position of each BWP in the remaining BWPs obtained after the P BWPs are deleted from the N BWPs.

For example, with reference to Table 1, when N=4 and P=2, when the network-side device deletes BWPs whose BWP identifiers are 2 and 4 from the N BWPs shown in Table 1, the position of each BWP in the remaining BWPs obtained after the P BWPs are deleted is updated in ascending order of BWP identifiers, as shown in Table 9.

TABLE 9

| Candidate bit state of bits included in an indication field | Position of a BWP | BWP identifier |
| --- | --- | --- |
| 00 | 1 | 0 |
| 01 | 2 | 1 |
| 10 | 3 | 3 |
| 11 | 4 | |

In another example, when a position of a BWP is determined based on a BWP identifier of the BWP, or a positional sequence of BWPs is a BWP sequence configured by the network-side device, the following scenarios exist.

In a first possible scenario, the M BWPs are added, and when N+M is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a correspondence between the initial BWP, the M BWPs, and the N BWPs, and the candidate bit states of the bit included in the indication field is established based on a positional sequence.

Optionally, when the network-side device adds the M BWPs, when N+M is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a position of each BWP in the initial BWP, the M BWPs, and the N BWPs may be updated based on a size of a BWP identifier, or a position of each BWP may be updated based on a BWP sequence configured by the network-side device.

For example, when N=2, and N is less than the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, the BWP identifier of the initial BWP is 0, and the position of the initial BWP is after those of the N BWPs. A sequence, of the N BWPs, configured by the network-side device is a BWP 1 and a BWP 2, and BWP identifiers of the BWP 1 and the BWP 2 are 3 and 4. When M=1, when the network-side device adds a BWP whose BWP identifier is 1, and the network-side device configures the BWP whose BWP identifier is 1 to be located after the N BWPs, a positional sequence, of N+M BWPs, updated based on a BWP sequence configured by the network-side device may be shown in Table 10.

TABLE 10

| Candidate bit state of bits included in an indication field | Position of a BWP | BWP identifier |
|---|---|---|
| 00 | 1 | 3 |
| 01 | 2 | 4 |
| 10 | 3 | 1 |
| 11 | 4 | 0 |

In a second possible scenario, the M BWPs are added, and when N+M is equal to the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, a correspondence between the M BWPs and the N BWPs, and the candidate bit states of the bit included in the indication field is established based on a positional sequence.

Specifically, when N+M is equal to the maximum quantity of BWPs that can be configured through the first higher layer signaling (for example, RRC signaling) when the terminal-side device is in the connected mode (for example, an RRC connected mode) or the maximum quantity of BWPs that can be determined by using the candidate bit states of the indication field that is used to determine the active BWP and that is in the downlink control information, the network-side device and the terminal-side device update a position of each BWP in the following manner: updating a position of each BWP in the M BWPs and the N BWPs based on a size of a BWP identifier, or updating a position of each BWP based on a BWP sequence configured by the network-side device.

For example, with reference to Table 6, when M=1, when the network-side device adds a BWP whose BWP identifier is 1 to the N BWPs shown in Table 6, and the network-side device configures the BWP whose BWP identifier is 1 to be located after the N BWPs, a positional sequence, of N+M BWPs, updated based on a BWP sequence configured by the network-side device may be shown in Table 11.

TABLE 11

| Candidate bit state of bits included in an indication field | Position of a BWP | BWP identifier |
|---|---|---|
| 00 | 1 | 3 |
| 01 | 2 | 4 |
| 10 | 3 | 2 |
| 11 | 4 | 1 |

In a third possible scenario, the P BWPs are deleted, and a correspondence is established, based on a positional sequence, between the candidate bit states of the bit included in the indication field and remaining BWPs obtained after the P BWPs are deleted.

Specifically, when the network-side device deletes the P BWPs, the network-side device and the terminal-side device update a position of each BWP in the following manner: updating, based on a size of a BWP identifier, a position of each BWP in the remaining BWPs obtained after the P BWPs are deleted from the N BWPs, or updating a position of each BWP based on a BWP sequence configured by the network-side device.

For example, with reference to Table 5, when P=1, when the network-side device deletes a BWP whose BWP identifier is 4 from the N BWPs shown in Table 5, a positional sequence, of the remaining BWPs, updated based on a BWP sequence configured by the network-side device may be shown in Table 12.

TABLE 12

| Candidate bit state of bits included in an indication field | Position of a BWP | BWP identifier |
|---|---|---|
| 00 | 1 | 3 |
| 01 | 2 | 2 |
| 10 | 3 | 1 |
| 11 | 4 | 0 |

In Table 12, a BWP whose BWP identifier is 0 is an initial BWP.

Further, in this embodiment of this application, the network-side device may indicate, through higher layer signaling, that a BWP is deleted or added. For example, the network-side device sends second higher layer signaling to the terminal-side device, where the second higher layer signaling is used to indicate to add the M BWPs. For another example, the network-side device sends third higher layer signaling to the terminal-side device, where the third higher layer signaling is used to indicate to delete the P BWPs. The second higher layer signaling and the third higher layer signaling may be RRC signaling or the like.

In an implementation, in this embodiment of this application, the network-side device may configure the N BWPs in a plurality of manners.

For example, a BWP identifier of a BWP in the N BWPs configured by the network-side device may be less than or equal to 2 to the $q^{th}$ power, $q=\lceil \log_2(N) \rceil$, and $\lceil \ \rceil$ is a round up operation.

For example, when N is 1, a BWP identifier of the configured BWP is 1. When N is 2, BWP identifiers of the two configured BWPs are 1 and 2, 1 and 3, or 2 and 3. When N is 3, BWP identifiers of the three configured BWPs are 1, 2, and 3. When N is 4, BWP identifiers of the four configured BWPs are 1, 2, 3, and 4.

Further, when the network-side device adds or deletes a BWP, after the BWP is added or deleted, BWP identifiers of remaining BWPs also need to meet the foregoing condition. For example, when the network-side device adds the M BWPs, BWP identifiers of the added M BWPs are all less than or equal to 2 to the $\lceil \log_2(N+M) \rceil_{th}$ power.

For example, when N is 1, 2, or 3, BWP identifiers of the added M BWPs are all less than 4.

For another example, N is 4. When the network-side device deletes the P BWPs, when a value of N−P is less than or equal to 3 and greater than 1, BWP identifiers of the remaining BWPs obtained after the P BWPs are deleted do not include 4. In this case, when P is 1, a BWP identifier of the deleted BWP is 4. When P is 2, BWP identifiers of the P deleted BWPs are 1 and 4, 2 and 4, or 3 and 4.

When a value of N−P is 1, BWP identifiers of the remaining BWPs obtained after the P BWPs are deleted can only be 1 or 0.

According to the foregoing method, it can be ensured that the indication field can indicate the active BWP in the configured BWPs regardless of whether the indication field indicates a configured BWP sequence or indicates a BWP identifier of a BWP, thereby avoiding a problem that the indication field cannot indicate the active BWP.

In an implementation, in this embodiment of this application, when the network-side device reconfigures a BWP, one piece of higher layer signaling is added to modify a BWP identifier, so that only the BWP identifier of the BWP is reconfigured, and bandwidth part configuration information of the BWP is not changed, thereby reducing signaling overheads.

With reference to the foregoing description, FIG. 2 is a schematic flowchart of an information indication method according to an embodiment of this application.

The method includes the following steps.

Step 201: A network-side device sends first higher layer signaling to a terminal-side device, where the first higher layer signaling is used to configure N BWPs, and N is a positive integer.

Step 202: The network-side device sends second higher layer signaling to the terminal-side device.

The second higher layer signaling is used to indicate to update BWP identifiers of K BWPs in the N BWPs, and K is a positive integer less than or equal to N.

Step 203: The terminal-side device receives the first higher layer signaling from the network-side device, where the first higher layer signaling is used to configure the N BWPs.

Step 204: The terminal-side device receives the second higher layer signaling from the network-side device, where the second higher layer signaling is used to indicate to update the BWP identifiers of the K BWPs in the N BWPs.

A size of an updated BWP identifier of each of the K BWPs is less than or equal to 2 to the $q^{th}$ power, and is not equal to 0. When N is less than a maximum quantity of BWPs that can be configured through the first higher layer signaling (for example, RRC signaling) when the terminal-side device is in a connected mode (for example, an RRC connected mode) or a maximum quantity of BWPs that can be determined through candidate bit states of an indication field that is used to determine an active BWP and that is in downlink control information, $q=\lceil \log_2(N+1) \rceil$. When N is equal to a maximum quantity of BWPs that can be configured through the first higher layer signaling (for example, RRC signaling) when the terminal-side device is in a connected mode (for example, an RRC connected mode) or a maximum quantity of BWPs that can be determined by using candidate bit states of an indication field that is used to determine an active BWP and that is in downlink control information, $q=\lceil \log_2(N) \rceil$. $\lceil\ \rceil$ is a round up operation.

For example, when K is 1, the second higher layer signaling in this embodiment of this application includes a BWP identifier change information element (BWP-Id change information element), which has six bits in total. A structure of an abstract syntax notation one (ASN.1) is described as follows:

| BWP-Id Change::= | SEQUENCE { |
| --- | --- |
| UpdatedBWP-Id | BWP-Id, |
| OPTIONAL, -- Cond SpCellAdd | |
| PreviousBWP-Id | BWP-Id, |
| ... | |
| } | |

UpdatedBWP-Id indicates an updated BWP identifier, and PreviousBWP-Id indicates a BWP identifier before the update.

For another example, when K is 2, a structure of an ASN.1 in the second higher layer signaling in this embodiment of this application may be described as follows:

| BWP-Id Change::= | SEQUENCE { |
| --- | --- |
| UpdatedBWP-Id1 | BWP-Id, |
| OPTIONAL, -- Cond SpCellAdd | |
| PreviousBWP-Id1 | BWP-Id, |
| UpdatedBWP-Id2 | BWP-Id, |
| OPTIONAL, -- Cond SpCellAdd | |
| PreviousBWP-Id2 | BWP-Id, |
| ... | |
| } | |

UpdatedBWP-Id1 and UpdatedBWP-Id2 indicate updated BWP identifiers, and PreviousBWP-Id1 and PreviousBWP-Id2 indicate BWP identifiers before the update. When K is another value, refer to the description herein. Details are not described herein again.

If a quantity of BWPs configured for the terminal-side device through the first higher layer signaling is 4, identifiers of the configured N BWPs are 3, 4, 1, and 2. The network-side device indicates the terminal-side device to delete a BWP whose BWP identifier is 1. However, because the BWP whose BWP identifier is 1 is deleted, a quantity of configured BWPs is equal to 3. The indication field includes two bits in this case. According to an existing solution, the indication field indicates a BWP identifier of the active BWP, but the two bits cannot indicate the BWP identifier 4.

If a reconfiguration solution is used, the terminal-side device needs to be indicated to delete bandwidth part configuration information for the BWP identifier 4. Then, the network-side device reconfigures a BWP for the terminal-side device based on the bandwidth part configuration information for the BWP identifier 4. For the reconfigured BWP, only the BWP identifier is changed from 4 to 1. Finally, the reconfigured BWP is delivered to the terminal-side device through higher layer signaling. According to the foregoing method, the network-side device does not need to indicate, through the second higher layer signaling, the terminal-side device to delete the bandwidth part configuration information for the BWP identifier 4, and the terminal-side device reserves the bandwidth part configuration information for the BWP identifier 4. The network-side device indicates the terminal-side device to change the BWP identifier from 4 to 1 through the second higher layer signaling. That is, a value of UpdatedBWP-Id in the structure of the ASN.1 is 1, and a binary value is 001; a value of PreviousBWP-Id is 4, and a binary value is 100. In this way, the bandwidth part configuration information for the BWP identifier 4 is reserved, and a problem that a BWP whose BWP identifier is 4 cannot be indicated by using two bits is resolved.

In this embodiment of this application, the network-side device may directly indicate the BWP identifier of the active BWP by using the indication field. Therefore, compared with the foregoing embodiment, this embodiment improves system efficiency because a position of the active BWP in the configured N BWPs does not need to be determined before the BWP is activated.

Figure 3:
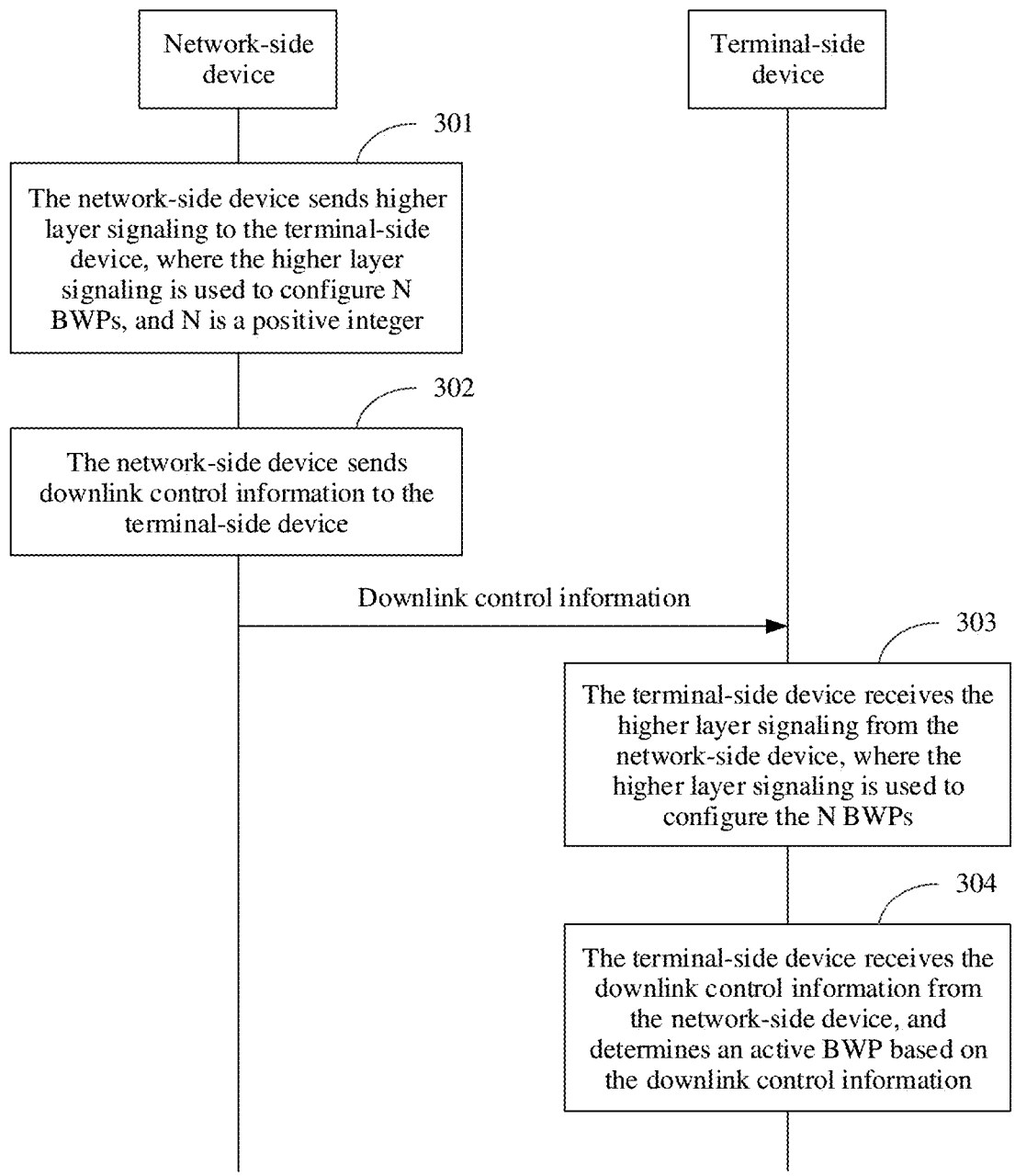
FIG. 3 is a schematic flowchart of an information update method according to an embodiment of this application.

With reference to the foregoing description, FIG. 3 is a schematic flowchart of an information indication method according to an embodiment of this application.

The method includes the following steps.

Step 301: A network-side device sends higher layer signaling to a terminal-side device, where the higher layer signaling is used to configure N BWPs, and N is a positive integer. Optionally, because an initial BWP exists for the terminal-side device, N is less than a maximum quantity of BWPs supported by the terminal-side device.

Step 302: The network-side device sends downlink control information to the terminal-side device, where the downlink control information includes an indication field, and the indication field indicates a BWP identifier of an active BWP.

A quantity of bits corresponding to a maximum quantity of BWPs supported by the terminal-side device is X. To use a quantity L of bits of the indication field in the downlink control information to indicate the identifier of the active BWP in the maximum quantity of supported BWPs, the quantity L of bits of the indication field in the downlink control information is greater than or equal to X.

Step 303: The terminal-side device receives the higher layer signaling from the network-side device, where the higher layer signaling is used to configure the N BWPs.

Step 304: The terminal-side device receives the downlink control information from the network-side device, and determines the active BWP based on the downlink control information.

In step 301 to step 304, the indication field always indicates the BWP identifier of the active BWP by using the L bits. This is irrelevant to a configured sequence of the configured N BWPs.

In this embodiment of this application, a value of L may be 3, or may be greater than 3. Details are not described herein.

For example, as shown in Table 13, the maximum quantity of BWPs supported by the terminal-side device is 5, including the N (for example, 4) configured BWPs (a BWP identifier 1, a BWP identifier 2, a BWP identifier 3, and a BWP identifier 4), and the initial BWP (a BWP identifier 0). The active BWP may be one of the five BWPs. Therefore, the quantity of bits of the indication field in the downlink control information is at least 3.

TABLE 13

| Candidate bit state of an indication field | BWP identifier |
|---|---|
| 000 | 0 |
| 001 | 1 |
| 010 | 2 |
| 011 | 3 |
| 100 | 4 |
| 101-111 | Reserved |

With reference to Table 13, when the indication field is 100, it may indicate that a BWP whose BWP identifier is 4 is to be activated. Other cases are not described. In Table 13, 101 to 111 may be reserved bits. Specifically, content indicated by 101 to 111 may be determined based on an actual situation. Details are not described herein again. In Table 13, the BWP identifier 0 is used to identify the initial BWP, and the BWP identifier 1 to the BWP identifier 4 are used to identify the N configured BWPs.

Figure 4:
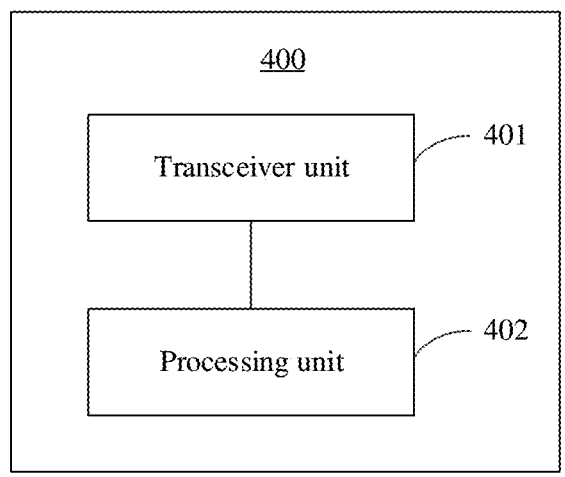
FIG. 4 is a schematic structural diagram of a communications apparatus according to an embodiment of this application.

FIG. 4 is a schematic structural diagram of a communications apparatus according to an embodiment of this application. The communications apparatus may be configured to perform an action of the terminal-side device or the network-side device in the foregoing method embodiments. The communications apparatus 400 includes a transceiver unit 401 and a processing unit 402.

When the communications apparatus 400 performs the action of the terminal-side device in the procedure shown in FIG. 1, the transceiver unit 401 and the processing unit 402 separately perform the following steps.

The transceiver unit 401 is configured to receive first higher layer signaling from a network-side device, where the first higher layer signaling is used to configure N bandwidth parts BWPs, and N is a positive integer.

The processing unit 402 is configured to receive downlink control information from the network-side device, and determine an active BWP based on the downlink control information.

When N is less than a maximum quantity of BWPs supported by the terminal-side device, the downlink control information indicates a position of the active BWP in an initial BWP and the N BWPs.

In an optional implementation, a position of the initial BWP is before those of the N BWPs or after those of the N BWPs.

In an optional implementation, the downlink control information indicates the position of the active BWP by using the indication field.

The transceiver unit 401 is further configured to receive second higher layer signaling from the network-side device, where the second higher layer signaling is used to indicate to add M BWPs, and M is a positive integer.

When N+M is less than the maximum quantity of BWPs supported by the terminal-side device, the processing unit 402 is further configured to establish, based on a positional sequence, a correspondence between the initial BWP, the M BWPs, and the N BWPs, and candidate bit states of a bit included in the indication field.

In an optional implementation, the downlink control information indicates the position of the active BWP by using the indication field.

The transceiver unit 401 is further configured to receive third higher layer signaling from the network-side device, where the third higher layer signaling is used to indicate to delete P BWPs, and P is a positive integer less than N.

The processing unit 402 is further configured to establish, based on a positional sequence, a correspondence between the candidate bit states of the bit included in the indication field and remaining BWPs obtained after the P BWPs are deleted from the N BWPs and the initial BWP.

In an optional implementation, the downlink control information indicates the position of the active BWP by using the indication field.

The transceiver unit 401 is further configured to receive second higher layer signaling from the network-side device, where the second higher layer signaling is used to indicate to add M BWPs, and M is a positive integer.

When N+M is less than the maximum quantity of BWPs supported by the terminal-side device, the processing unit 402 is further configured to establish, based on BWP identifiers, a correspondence between the initial BWP, the M BWPs, and the N BWPs, and candidate bit states of a bit included in the indication field.

In an optional implementation, the downlink control information indicates the position of the active BWP by using the indication field.

The transceiver unit 401 is further configured to receive third higher layer signaling from the network-side device, where the third higher layer signaling is used to indicate to delete P BWPs, and P is a positive integer less than N.

The processing unit 402 is further configured to establish, based on BWP identifiers, a correspondence between the candidate bit states of the bit included in the indication field and remaining BWPs obtained after the P BWPs are deleted from the N BWPs and the initial BWP.

In this embodiment of this application, when the communications apparatus 400 performs the action of the network-side device in the procedure shown in FIG. 1, the transceiver unit 401 and the processing unit 402 separately perform the following steps.

The processing unit 402 is configured to send, via the transceiver unit 401, first higher layer signaling to a terminal-side device, where the first higher layer signaling is used to configure N bandwidth parts BWPs, and N is a positive integer.

The processing unit 402 is configured to send, via the transceiver unit 401, downlink control information to the terminal-side device.

When N is less than a maximum quantity of BWPs supported by the terminal-side device, the downlink control information indicates a position of the active BWP in an initial BWP and the N BWPs.

In an optional implementation, a position of the initial BWP is before those of the N BWPs or after those of the N BWPs.

In an optional implementation, the downlink control information indicates the position of the active BWP by using the indication field.

The transceiver unit 401 is further configured to add M BWPs, where M is a positive integer.

When N+M is less than the maximum quantity of BWPs supported by the terminal-side device, the processing unit 402 is further configured to establish, based on a positional sequence, a correspondence between the initial BWP, the M BWPs, and the N BWPs, and candidate bit states of a bit included in the indication field.

In an optional implementation, the downlink control information indicates the position of the active BWP by using the indication field.

The transceiver unit 401 is further configured to delete P BWPs, where P is a positive integer less than N.

The processing unit 402 is further configured to establish, based on a positional sequence, a correspondence between the candidate bit states of the bit included in the indication field and remaining BWPs obtained after the P BWPs are deleted from the N BWPs and the initial BWP.

In an optional implementation, the downlink control information indicates the position of the active BWP by using the indication field.

The transceiver unit 401 is further configured to add M BWPs, where M is a positive integer.

When N+M is less than the maximum quantity of BWPs supported by the terminal-side device, the processing unit 402 is further configured to establish, based on BWP identifiers, a correspondence between the initial BWP, the M BWPs, and the N BWPs, and candidate bit states of a bit included in the indication field.

In an optional implementation, the transceiver unit 401 is specifically configured to: send second higher layer signaling to the terminal-side device, where the second higher layer signaling is used to indicate to add the M BWPs.

In an optional implementation, the downlink control information indicates the position of the active BWP by using the indication field.

The transceiver unit 401 is further configured to delete P BWPs, where P is a positive integer less than N.

The processing unit 402 is further configured to establish, based on BWP identifiers, a correspondence between the candidate bit states of the bit included in the indication field and remaining BWPs obtained after the P BWPs are deleted from the N BWPs and the initial BWP.

In an optional implementation, the transceiver unit 401 is specifically configured to: send third higher layer signaling to the terminal-side device, where the third higher layer signaling is used to indicate to delete the P BWPs.

FIG. 5 is a schematic structural diagram of a terminal-side device according to an embodiment of this application. The terminal-side device shown in FIG. 5 may be a hardware circuit implementation of the communications apparatus shown in FIG. 4. The terminal-side device may be applicable to the flowchart shown in FIG. 1, and performs functions of the terminal-side device in the foregoing method embodiments. For ease of description, FIG. 5 shows only main components of the terminal-side device. As shown in FIG. 5, the terminal-side device 500 includes a processor 501, a memory 502, a transceiver 503, an antenna 504, and an input/output apparatus 505. The processor 501 is mainly configured to: process a communication protocol and communication data, control an entire wireless communications apparatus, execute a software program, and process data of the software program. For example, the processor 501 is configured to support a wireless communications apparatus in performing the actions described in the foregoing method embodiments. The memory 502 is mainly configured to store a software program and data. The transceiver 503 is mainly configured to perform conversion between a baseband signal and a radio frequency signal, and process a radio frequency signal. The antenna 504 is mainly configured to receive and send a radio frequency signal in an electromagnetic wave form. The input/output apparatus 505, such as a touchscreen, a display screen, or a keyboard, is mainly configured to: receive data entered by a user and output data to the user.

The transceiver 503 is configured to receive first higher layer signaling from a network-side device, where the first higher layer signaling is used to configure N bandwidth parts BWPs, and N is a positive integer.

The processor 501 is configured to: receive downlink control information from the network-side device, and determine an active BWP based on the downlink control information. When N is less than a maximum quantity of BWPs supported by the terminal-side device, the downlink control information indicates a position of the active BWP in an initial BWP and the N BWPs.

The terminal-side device 500 may further perform other content. For details, refer to the descriptions of steps 103 and 104. Details are not described herein again.

Figure 6:
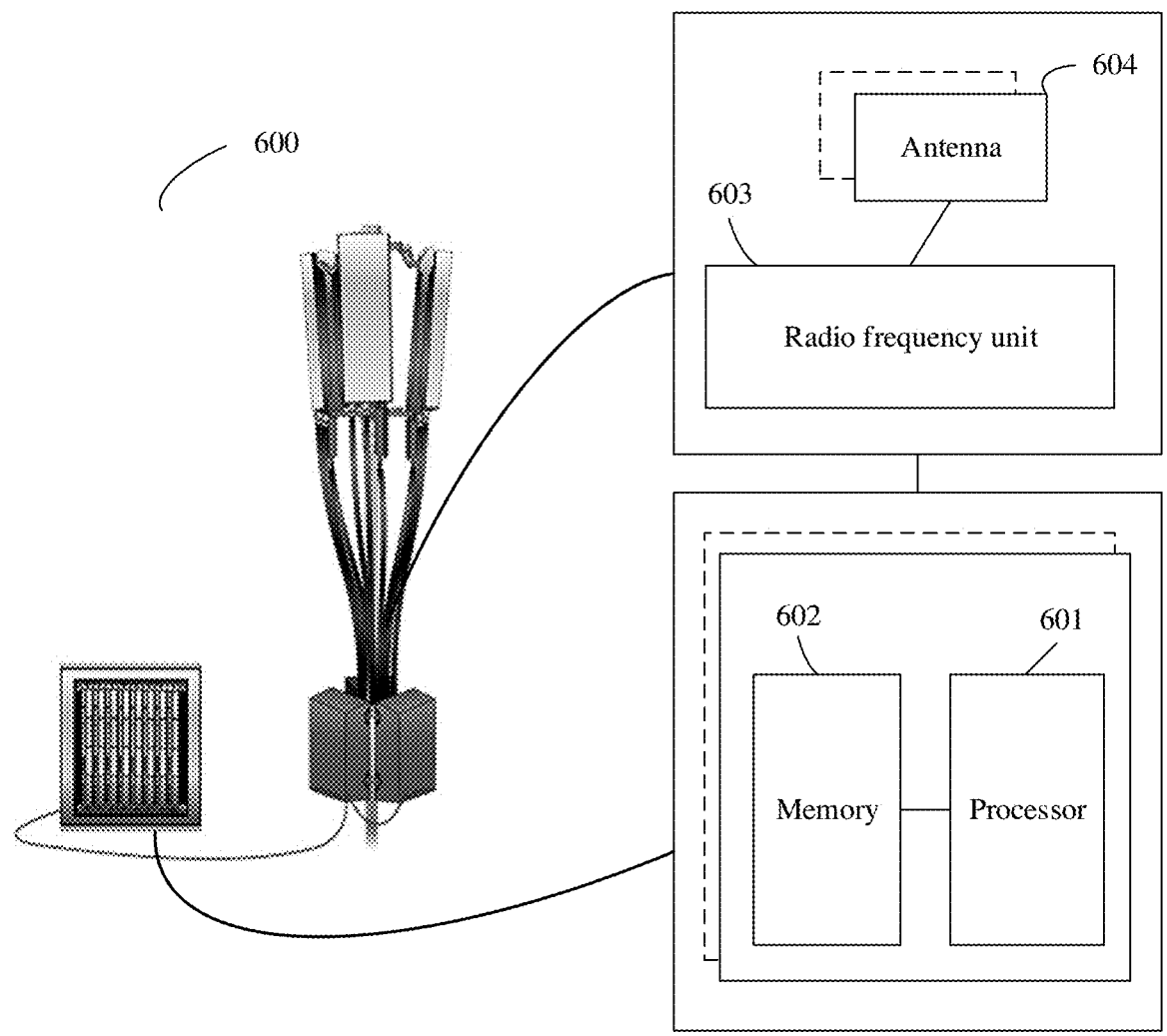
FIG. 6 is a schematic structural diagram of a network-side device according to an embodiment of this application.

FIG. 6 is a schematic structural diagram of a network-side device. The network-side device may be applied to the method shown in FIG. 1. The network-side device 600 includes a processor 601, a memory 602, a radio frequency unit 603, an antenna 604, and the like.

The network-side device 600 may be configured to implement the method of the network-side device in the foregoing method embodiments. Details are as follows:

The processor 601 in the network-side device 600 may perform the following steps of: sending, through the radio frequency unit 603, first higher layer signaling to a terminal-side device, where the first higher layer signaling is used to configure N bandwidth parts BWPs, and N is a positive integer; and sending downlink control information to the terminal-side device.

When N is less than a maximum quantity of BWPs supported by the terminal-side device, the downlink control information indicates a position of the active BWP in an initial BWP and the N BWPs.

The network-side device 600 may further perform other content. For details, refer to descriptions of steps 101 and 102. Details are not described herein again.

It is clear that, a person skilled in the art can make various modifications and variations to this application without departing from the scope of this application. In this way, this application is intended to cover these modifications and variations provided that these modifications and variations of this application fall within the scope of the claims of this application and their equivalent technologies.

What is claimed is:

1. A method, comprising:
receiving, by a terminal-side device, first higher layer signaling from a network-side device, wherein the first higher layer signaling configures N bandwidth parts (BWPs) for the terminal-side device, and N is a positive integer; and
receiving, by the terminal-side device, downlink control information from the network-side device; and
determining, by the terminal-side device, an active BWP to use for communication based on the downlink control information, wherein when N is less than a maximum quantity of BWPs that are configurable through the first higher layer signaling when the terminal-side device is in a connected mode, the downlink control information indicates a position of the active BWP in a group comprising an initial BWP used by the terminal-side device and the N BWPs.

2. The method according to claim 1, wherein a position of the initial BWP is before positions of the N BWPs.

3. The method according to claim 1, wherein the downlink control information indicates the position of the active BWP using an indication field, and the method further comprises:
receiving, by the terminal-side device, second higher layer signaling from the network-side device, wherein the second higher layer signaling indicates to add M BWPs to BWPs configured for the terminal-side device, and M is a positive integer; and
when N+M is less than the maximum quantity of BWPs that are configurable through the first higher layer signaling when the terminal-side device is in the connected mode, establishing, by the terminal-side device based on a positional sequence, a correspondence between BWPs of a group of BWPs including the initial BWP, the M BWPs, and the N BWPs, and candidate bit states of one or more bits comprised in the indication field.

4. The method according to claim 1, wherein the downlink control information indicates the position of the active BWP using an indication field, and the method further comprises:
receiving, by the terminal-side device, third higher layer signaling from the network-side device, wherein the third higher layer signaling indicates to delete P BWPs from configured BWPs of the terminal-side device, and P is a positive integer less than N; and
establishing, by the terminal-side device based on a positional sequence, a correspondence between candidate bit states of one or more bits comprised in the indication field and remaining BWPs of configured BWPs of the terminal-side device after the P BWPs are deleted.

5. The method according to claim 1, wherein the downlink control information indicates the position of the active BWP using an indication field, and the method further comprises:
receiving, by the terminal-side device, second higher layer signaling from the network-side device, wherein the second higher layer signaling indicates to add M BWPs to BWPs configured for the terminal-side device, and M is a positive integer; and
when N+M is less than the maximum quantity of BWPs that are configurable through the first higher layer signaling when the terminal-side device is in the connected mode, establishing, by the terminal-side device based on BWP identifiers, a correspondence between BWPs of a group of BWPs including the initial BWP, the M BWPs, the N BWPs, and candidate bit states of one or more bits comprised in the indication field.

6. The method according to claim 1, wherein the downlink control information indicates the position of the active BWP using an indication field, and the method further comprises:
receiving, by the terminal-side device, third higher layer signaling from the network-side device, wherein the third higher layer signaling indicates to delete P BWPs from BWPs configured for the terminal-side device, and P is a positive integer less than N; and
establishing, by the terminal-side device based on BWP identifiers, a correspondence between candidate bit states of one or more bit comprised in the indication field and remaining BWPs of configured BWPs of the terminal-side device after the P BWPs are deleted.

7. A method, comprising:
sending, by a network-side device, first higher layer signaling to a terminal-side device, wherein the first higher layer signaling configures N bandwidth parts (BWPs) for the terminal-side device, and N is a positive integer; and
sending, by the network-side device, downlink control information to the terminal-side device, wherein when N is less than a maximum quantity of BWPs that are configurable through the first higher layer signaling when the terminal-side device is in a connected mode, the downlink control information indicates a position of an active BWP in a group comprising an initial BWP used by the terminal-side device and the N BWPs.

8. The method according to claim 7, wherein a position of the initial BWP is before positions of the N BWPs.

9. The method according to claim 7, wherein the downlink control information indicates the position of the active BWP using an indication field, and the method further comprises:
adding, by the network-side device, M BWPs to BWPs configured for the terminal-side device, wherein M is a positive integer; and
when N+M is less than the maximum quantity of BWPs that are configurable through the first higher layer signaling when the terminal-side device is in the connected mode, establishing, by the network-side device based on a positional sequence, a correspondence between BWPs of a group comprising the initial BWP, the M BWPs, and the N BWPs, and candidate bit states of one or more bits comprised in the indication field.

10. The method according to claim 9, wherein adding, by the network-side device, the M BWPs to BWPs configured for the terminal-side device comprises:
sending, by the network-side device, second higher layer signaling to the terminal-side device, wherein the second higher layer signaling indicates to add the M BWPs to BWPs configured for the terminal-side device.

11. The method according to claim 7, wherein the downlink control information indicates the position of the active BWP using an indication field, and the method further comprises:
deleting, by the network-side device, P BWPs from BWPs configured for the terminal-side device, wherein P is a positive integer less than N; and
establishing, by the network-side device based on a positional sequence, a correspondence between candidate bit states of one or more bits comprised in the indication field and remaining BWPs obtained after the P BWPs are deleted.

12. The method according to claim 7, wherein the downlink control information indicates the position of the active BWP using an indication field, and the method further comprises:
adding, by the network-side device, M BWPs to BWPs configured for the terminal-side device, wherein M is a positive integer; and
when N+M is less than the maximum quantity of BWPs that are configurable through the first higher layer signaling when the terminal-side device is in the connected mode, establishing, by the network-side device based on BWP identifiers, a correspondence between BWPs of a group comprising the initial BWP, the M BWPs, and the N BWPs, and candidate bit states of one or more bits comprised in the indication field.

13. The method according to claim 7, wherein the downlink control information indicates the position of the active BWP using an indication field, and the method further comprises:
deleting, by the network-side device, P BWPs from BWPs configured for the terminal-side device, wherein P is a positive integer less than N; and
establishing, by the network-side device based on BWP identifiers, a correspondence between candidate bit states of one or more bits comprised in the indication field and remaining BWPs obtained after the P BWPs are deleted.

14. The method according to claim 13, wherein deleting, by the network-side device, the P BWPs from BWPs configured for the terminal-side device comprises:
sending, by the network-side device, third higher layer signaling to the terminal-side device, wherein the third higher layer signaling indicates to delete the P BWPs.

15. A terminal-side device, comprising:
at least one processor and at least one non-transitory memory storing instructions;
wherein the instructions are executable by the at least one processor to cause the terminal-side device to:
receive first higher layer signaling from a network-side device, wherein the first higher layer signaling configures N bandwidth parts (BWPs) for the terminal-side device, and N is a positive integer;
receive downlink control information from the network-side device; and
determine an active BWP to use to communicate based on the downlink control information, wherein when N is less than a maximum quantity of BWPs that are configurable through the first higher layer signaling when the terminal-side device is in a connected mode, the downlink control information indicates a position of the active BWP in a group comprising an initial BWP used by the terminal-side device and the N BWPs.

16. The terminal-side device according to claim 15, wherein a position of the initial BWP is before positions of the N BWPs or after positions of the N BWPs.

17. The terminal-side device according to claim 15, wherein the downlink control information indicates the position of the active BWP using an indication field, and the instructions are executable by the at least one processor to further cause the terminal-side device to:
receive second higher layer signaling from the network-side device, wherein the second higher layer signaling indicates to add M BWPs to configured BWPs of the terminal-side device, and M is a positive integer; and
when N+M is less than the maximum quantity of BWPs that are configurable through the first higher layer signaling when the terminal-side device is in the connected mode, establish, based on a positional sequence, a correspondence between BWPs of a group comprising the initial BWP, the M BWPs, and the N BWPs, and candidate bit states of one or more bits comprised in the indication field.

18. The terminal-side device according to claim 15, wherein the downlink control information indicates the position of the active BWP using an indication field; and the instructions are executable by the at least one processor to further cause the terminal-side device to:
receive third higher layer signaling from the network-side device, wherein the third higher layer signaling indicates to delete P BWPs from BWPs configured for the terminal-side device, and P is a positive integer less than N; and
establish, based on a positional sequence, a correspondence between candidate bit states of one or more bits comprised in the indication field and remaining BWPs obtained after the P BWPs are deleted.

19. The terminal-side device according to claim 15, wherein the downlink control information indicates the position of the active BWP using an indication field, and the instructions are executable by the at least one processor to further cause the terminal-side device to:
receive second higher layer signaling from the network-side device, wherein the second higher layer signaling indicates to add M BWPs to BWPs configured for the terminal-side device, and M is a positive integer; and
when N+M is less than the maximum quantity of BWPs that are configurable through the first higher layer signaling when the terminal-side device is in the connected mode, establish, based on BWP identifiers, a correspondence between BWPs of a group comprising the initial BWP, the M BWPs, and the N BWPs, and candidate bit states of one or more bits comprised in the indication field.

20. The terminal-side device according to claim 15, wherein the downlink control information indicates the position of the active BWP using an indication field, and the instructions are executable by the at least one processor to further cause the terminal-side device to:
receive third higher layer signaling from the network-side device, wherein the third higher layer signaling indicates to delete P BWPs from BWPs configured for the terminal-side device, and P is a positive integer less than N; and
establish, based on BWP identifiers, a correspondence between candidate bit states of one or more bits comprised in the indication field and remaining BWPs obtained after the P BWPs are deleted.

21. A network-side device, comprising:
at least one processor; and
at least one non-transitory memory storing instructions, wherein the instructions are executable by the at least one processor to cause the network-side device to:
send first higher layer signaling to a terminal-side device, wherein the first higher layer signaling configures N bandwidth parts (BWPs) for the terminal-side device, and N is a positive integer; and
send downlink control information to the terminal-side device, wherein when N is less than a maximum quantity of BWPs that are configurable through the first higher layer signaling when the terminal-side device is in a connected mode, the downlink control information indicates a position of an active BWP in a group comprising an initial BWP and the N BWPs.

22. The network-side device according to claim 21, wherein a position of the initial BWP is before positions of the N BWPs or after positions of the N BWPs.

23. The network-side device according to claim 21, wherein the downlink control information indicates the position of the active BWP using an indication field, and the instructions are executable by the at least one processor to further cause the network-side device to:
   add M BWPs to BWPS configured BWPs of the terminal-side device, wherein M is a positive integer; and
   when N+M is less than the maximum quantity of BWPs that are configurable through the first higher layer signaling when the terminal-side device is in the connected mode, establish, based on a positional sequence, a correspondence between BWPS of a group comprising the initial BWP, the M BWPs, and the N BWPs, and candidate bit states of one or more bits comprised in the indication field.

24. The network-side device according to claim 21, wherein the downlink control information indicates the position of the active BWP using an indication field, and the instructions are executable by the at least one processor to further cause the network-side device to:
   delete P BWPs from configured BWPs of the terminal-side device, wherein P is a positive integer less than N; and
   establish, based on a positional sequence, a correspondence between candidate bit states of one or more bits comprised in the indication field and remaining BWPs obtained after the P BWPs are deleted.

25. The network-side device according to claim 21, wherein the downlink control information indicates the position of the active BWP using an indication field, and the instructions are executable by the at least one processor to further cause the network-side device to:
   add M BWPs to configured BWPs of the terminal-side device, wherein M is a positive integer; and
   when N+M is less than the maximum quantity of BWPs that are configurable through the first higher layer signaling when the terminal-side device is in the connected mode, establish, based on BWP identifiers, a correspondence between BWPs of a group comprising the initial BWP, the M BWPs, and the N BWPs, and candidate bit states of one or more bits comprised in the indication field.

26. The network-side device according to claim 25, wherein the instructions are executable by the at least one processor to cause the network-side device to:
   send second higher layer signaling to the terminal-side device, wherein the second higher layer signaling indicates to add the M BWPs.

27. The network-side device according to claim 21, wherein the downlink control information indicates the position of the active BWP using an indication field, and the instructions are executable by the at least one processor to further cause the network-side device to
   delete P BWPs from configured BWPs of the terminal-side device, wherein P is a positive integer less than N; and
   establish, based on BWP identifiers, a correspondence between candidate bit states of one or more bits comprised in the indication field and remaining BWPs obtained after the P BWPs are deleted.

28. The network-side device according to claim 27, wherein the instructions are executed by the at least one processor to cause the network-side device to
   send third higher layer signaling to the terminal-side device, wherein the third higher layer signaling indicates to delete the P BWPs.

* * * * *